(12) United States Patent
Frank

(10) Patent No.: US 8,916,828 B2
(45) Date of Patent: Dec. 23, 2014

(54) RADIATION DETECTION APPARATUS AND METHOD OF USING SAME

(75) Inventor: John M. Frank, Hartville, OH (US)

(73) Assignee: Saint-Global Ceramics & Plastics, Inc., Worcester, MA (US)

(*) Notice: Subject to any disclaimer, the term of this patent is extended or adjusted under 35 U.S.C. 154(b) by 239 days.

(21) Appl. No.: 13/602,426

(22) Filed: Sep. 4, 2012

(65) Prior Publication Data

US 2013/0234031 A1 Sep. 12, 2013

Related U.S. Application Data

(60) Provisional application No. 61/531,254, filed on Sep. 6, 2011.

(51) Int. Cl.
*G01T 1/20* (2006.01)

(52) U.S. Cl.
CPC .................................. *G01T 1/2006* (2013.01)
USPC .................................. 250/361 R; 250/390.11

(58) Field of Classification Search
USPC ............... 250/361 R, 362, 367, 368, 370.09, 250/390.01, 390.11
See application file for complete search history.

(56) References Cited

U.S. PATENT DOCUMENTS

| | | |
|---|---|---|
| 4,667,107 A | 5/1987 | Wang |
| 5,606,167 A | 2/1997 | Miller |
| 5,990,472 A | 11/1999 | Rinne |
| 7,414,247 B2 | 8/2008 | Williams et al. |
| 7,863,579 B2 | 1/2011 | Suhami |
| 2004/0178337 A1 | 9/2004 | Kurkoski et al. |
| 2009/0321652 A1 | 12/2009 | Motomura et al. |
| 2011/0089332 A1* | 4/2011 | Ivan et al. ................ 250/390.11 |

OTHER PUBLICATIONS

P. Chiaro, "Review and Analysis of the Innovative American Technology Neutron Detection System," Oak Ridege National Laboratory, managed by UT-BATTELEE, LLC for the U.S. Department of Energy, DOE Project No. NFE-06-00460, dated Aug. 2010, 10 pages.
A. Bernardini et al., "A Dosimetry Procedure Based on Storage Phosphors With Short Fading Time," Radiation Protection Dosimetry (2008), vol. 132, No. 3, pp. 297-302, Advance Access publication, dated Dec. 9, 2008, 6 pages.
Lintereur et al., "Coated Fiber Neutron Detector Test," PNNL-18919, Pacific Northwest National Laboratory, operated by BATTELLE for the U.S. Department of Energy, dated Oct. 22, 2009, 35 pages.
Dosimetry+Imaging, <http://dosimetryimaging.com/joomla/>, dated 2011, printed Nov. 16, 2012, 2 pages.

* cited by examiner

*Primary Examiner* — Mark R Gaworecki
(74) *Attorney, Agent, or Firm* — Abel Law Group, LLP; Robert N. Young

(57) ABSTRACT

A radiation detection apparatus can include a semi-cylindrical radiation sensor having a corresponding radiation sensing region, and a photosensor that is optically coupled to the radiation sensor.

22 Claims, 5 Drawing Sheets

RADIATION DETECTION APPARATUS AND METHOD OF USING SAME

This application claims priority to and the benefit of U.S. Prov. Pat. App. No. 61/531,254, filed Sep. 6, 2011, and is incorporated herein by reference in its entirety.

FIELD OF THE DISCLOSURE

The present disclosure is directed to radiation detection devices and methods of using the same, and more particularly to a radiation detection device including the optical fibers, and methods of making and using the foregoing.

BACKGROUND

A radiation detector can include a plastic scintillator, such as BC-704™-brand scintillator available from Saint-Gobain Crystals of Hiram, Ohio, USA. The BC-704™-brand scintillator includes alternating layers of wavelength shifting fibers and phosphorescent materials.

FIG. 1 includes a cross-sectional view of a conventional radiation sensor 10 that includes layers of phosphorescent material 122 that includes $^6$LiF and silver doped ZnS (ZnS:Ag). In another scintillator, copper doped ZnS (ZnS:Cu) may be used instead of ZnS:Ag. Scintillating light from the phosphorescent material 122 passes through a clear epoxy 126 and is received by rectangular-shaped wavelength shifting fibers 124. A reflector 140 surrounds the combination of the phosphorescent material 122, the wavelength shifting fibers 124, and the clear epoxy 126 as illustrated in FIG. 1 to increase the amount of scintillating light received by the wavelength shifting fibers 124. The scintillating light is shifted to light of a longer wavelength and transmitted to a photosensor (not illustrated) that converts light received by the photosensor to an electronic signal. Further illustrated in FIG. 1 is a neutron moderator 160 that converts fast neutrons to thermal neutrons to increase the likelihood of capture by the phosphorescent material 122. The radiation sensor 10 can be in the form of a rectangle, and another scintillator can be in the form of a disk.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the term "cross section" or a variant thereof, refers to a direction that is substantially perpendicular to lengths of the optical fibers within a radiation sensing region of a radiation sensor.

The terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

Figure 2:
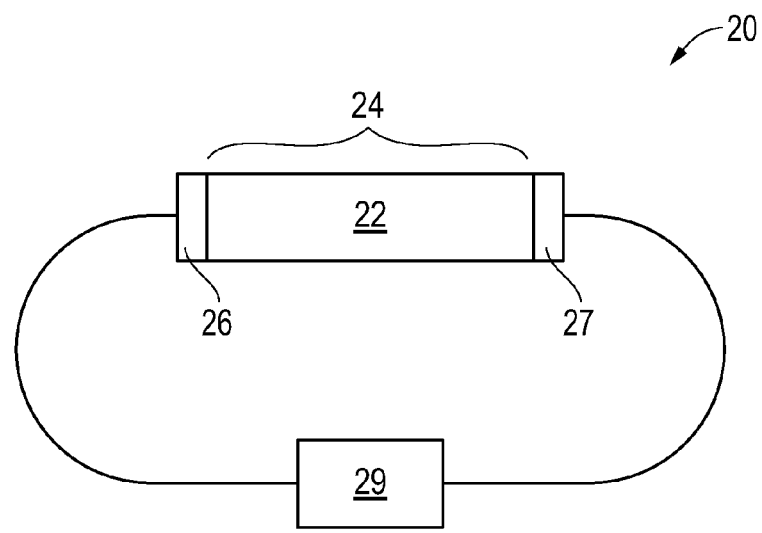
FIG. 2 is a schematic side view of an embodiment of a radiation sensor.

FIG. 2 includes an illustration of an embodiment of a radiation detection apparatus 20. In the embodiment illustrated, the radiation detection apparatus 20 includes a body or radiation sensor 22 and photosensors 26 and 27 that are optically coupled to the radiation sensor 22, which has a corresponding radiation sensing region 24. In a particular embodiment, the radiation sensor 22 has a main body that is only semi-cylindrical. Thus, the radiation sensor 22 may appear somewhat tubular. In other embodiments, the radiation sensor 22 can have many other shapes, some of which are described later in this specification. The radiation sensing region 24 can extend substantially to the ends of the radiation sensor 22 or a smaller portion thereof. For example, in another embodiment described later in this specification, the optical fibers may bend before reaching locations wherein the optical fibers are optically coupled to photosensors. The bends lie outside a radiation sensing region of the radiation sensor.

Each or both of the photosensors 26 and 27 can be in the form of a photomultiplier tube (PMT), a semiconductor-based photomultiplier, or a hybrid photosensor. The photosensors 26 and 27 can receive light from the optical fibers 22 and generate electrical pulses based on the numbers of photons that they receive. The photosensors 26 and 27 are electrically coupled to an electronics module 29. The electrical pulses can be shaped, digitized, analyzed, or any combination thereof by the electronics module 29 to provide information regarding the amount of light received from either or both of the photosensors 26 and 27 or other information.

The electronics module 29 can include an amplifier, a discriminator, an analog-to-digital signal converter, a photon counter, another electronic component, or any combination thereof. In an alternative embodiment (not illustrated), one of the photosensors 26 or 27 may be replaced by a reflector. Only one photosensor may be used with a reflector in place of the photosensor on the other side of the detector. Analysis may also incorporate one or more signal analysis algorithms in an application-specific integrated circuit ("ASIC"), a field-programmable gate array ("FPGA"), or another similar device.

Figure 3:
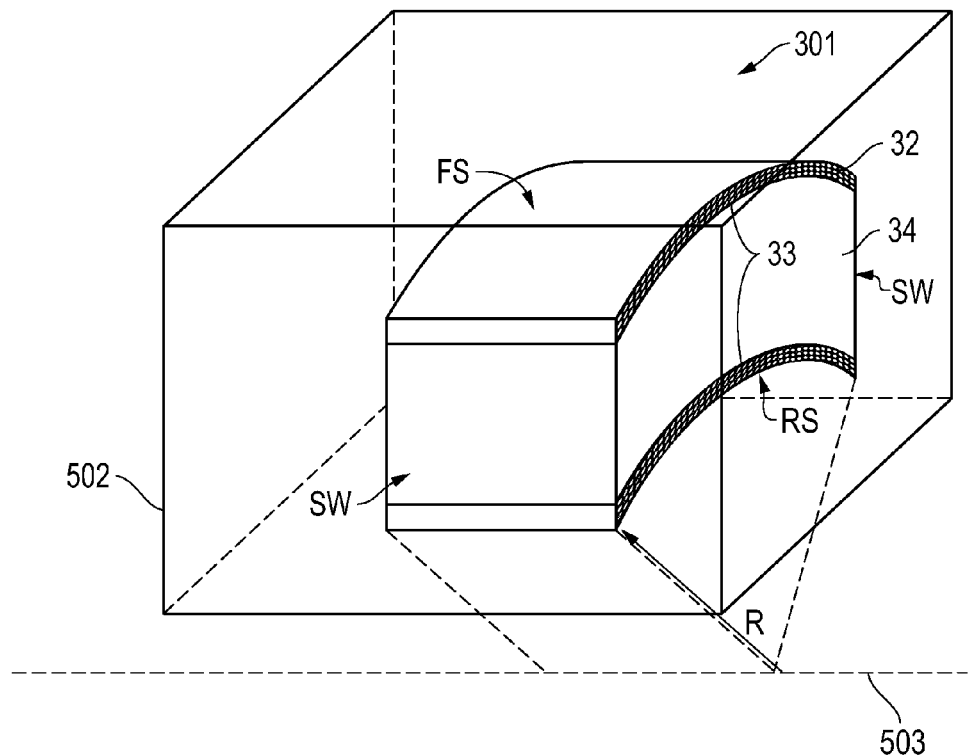
FIGS. 3 and 4 are isometric and sectional end views of a portion of an embodiment of a radiation detection apparatus.
Figure 4:
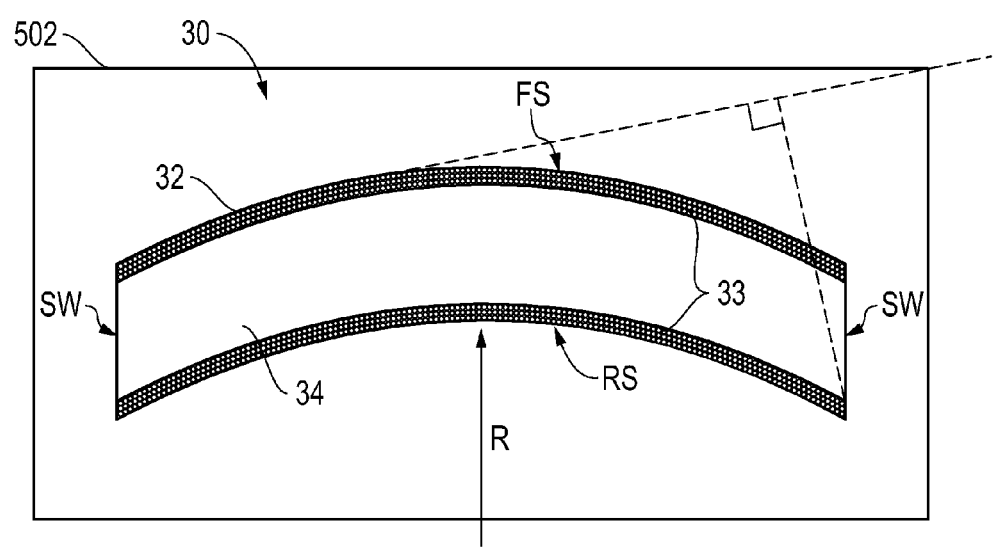

FIGS. 3 and 4 include an embodiment of a portion of a radiation sensor 30 inside a radiation detection apparatus 502, such as a housing. The radiation sensor can include optical fibers 32 as described herein. In some embodiments, the optical fibers 32 may be held together by a binder. In another embodiment, the optical fibers 32 can be held together mechanically, such as with an adhesive film. The optical fibers 32 may be arranged in an array of rows and columns (analogously to FIG. 1) or an irregular pattern (for example, not an array of rows and columns). Any of the elements previously described for the conventional detector of FIG. 1 may be incorporated into the embodiments disclosed herein. The optical fibers 32 can be in the form of a closely packed bundle, wherein a majority of the optical fibers 32 contact at least three other fibers. The space between fibers 32 can be occupied at least part with a binder. In another embodiment, the space between fibers 32 can be air or another gas.

Some embodiments of a radiation detection apparatus comprise a housing 502 having an axis 503 (FIG. 3). A radiation sensor 30 is disposed in the housing 502 and extends in an axial direction. The radiation sensor may have optical fibers 32 with photosensors 26, 27 (FIG. 2) coupled thereto. In addition, phosphorescent material and one or more reflectors may surround the optical fibers and phosphorescent material. An electronics module 29 may be electrically coupled to the photosensors 26, 27. The radiation sensor 30 may be semi-cylindrical in shape (FIGS. 3 and 4) and formed at a radius R relative to the axis 503.

The semi-cylindrical radiation sensor may span an arcuate range of approximately 45° to approximately 90°. The radius R may be in a range of about 6 inches to about 18 inches, such as 12 inches. As shown in the drawings, the radiation sensor may have a front surface FS that is convex, a rear surface RS that is concave and opposite the front surface, side walls SW that extend between the front and rear surfaces, and the side walls are flat and parallel to each other.

The body or radiation sensor may comprise two radiation sensors 33 that are separated by a moderator 34 that converts fast neutrons into thermal neutrons. Each of the radiation sensors 33 may have a radial thickness of about 0.1 inches to about 0.5 inches, and the moderator 34 may have a radial thickness of about 0.5 inches to about 2.0 inches, such as about 1.0 inch. The moderator may comprise a polymer, such as polyethylene.

The optical fibers may be formed in arrays and encased in a binder, the phosphorescent material may comprise layers between the arrays, and reflectors may be located on sides of the arrays, as shown and described herein. The radiation sensor may have a radiation sensing region in a direction tangent to the semi-cylindrical shape of at least approximately 2 meters, at least approximately 4 meters, at least approximately 8 meters, or at least approximately 10 meters. The targeted radiation may comprise neutrons and/or gamma radiation.

Still other embodiments may comprise only a radiation sensor, and/or a method of use having additional angular sensitivity compared to conventional flat designs. This permits embodiments to count more neutrons when a moving vehicle that may contain a source travels laterally in front of the semi-cylindrical detector. Current private and government specifications are set to test the detector head with a source 2 meters in front of the face of the detector. With improved angular sensitivity, embodiments sense more neutrons to be counted, which improves the signal-to-noise ratio and reduces false alarms when the source is presented to the detector tangentially.

The optical fibers can include optical substrates and some or all of the optical substrates may be coated. In an embodiment, the optical substrate can be an optical core by itself or a combination of an optical core surrounded by a cladding or other coating having a different refractive index as compared to the optical core, wherein such cladding or other coating can improve attenuation. The optical substrates can include a polymer. The polymer can include a polyacrylate, such as polymethylmethacrylate ("PMMA"); a polystyrene; a polyvinyltoluene; or another suitable light-transmitting polymer. In a particular embodiment, a layer including PMMA surrounding an optical core that includes polystyrene. The optical substrates may include a material, such as any of the foregoing polymers, that is capable of converting a fast neutron to a thermal neutron.

The optical substrates can also include a wavelength-shifting material, a scintillating material, or both together. In an embodiment, the optical substrates can shift the wavelength of scintillating light to a longer wavelength. For example, the optical substrates may shift the wavelength to blue light or green light.

For coated optical fibers, the coating can substantially surround the perimeter of an individual optical substrate. The coating can produce scintillating light in response to capturing targeted radiation. In an embodiment, the targeted radiation is neutrons, and in another embodiment, the targeted radiation is gamma radiation.

The coating includes a phosphorescent material. When the targeted radiation is neutrons, the phosphorescent material can include different materials. One of the materials can be capable of generating a secondary particle in response to capturing a targeted radiation. In an embodiment, the material can include $^6$Li or $^{10}$B. In a particular embodiment, the material can include $^6$LiF. Another material can be capable of generating scintillating light in response to exposure to the secondary particle. The other material can include a ZnS, a CdWO$_4$, a Y$_2$SiO$_5$, a ZnO, a ZnCdS, or any combination thereof. In a particular embodiment, the other material can include ZnS:Ag, ZnS:Cu, ZnS:Ti; Y$_2$SiO$_5$:Ce, ZnO:Ga, ZnCdS:Cu, or any combination thereof. The coating can further include a binder. The binder can be transparent or translucent to the scintillating light, wavelength shifted light, or both. In an example, the binder can be an organic material, such as an epoxy or an acrylate.

A radiation sensor formed in accordance with the concepts herein and has a relatively long radiation sensing region. In an embodiment, the radiation sensing region can be at least approximately 0.5 meters, at least approximately 1 meter, at least approximately 2 meters in a particular direction, such as length. The detector design as described herein is also scalable and can be used as a replacement for or in conjunction with $^3$He tubes of any size. In some portal sensing applications the tubes are approximately two inches in diameter and approximately to inches in length.

Figure 1:
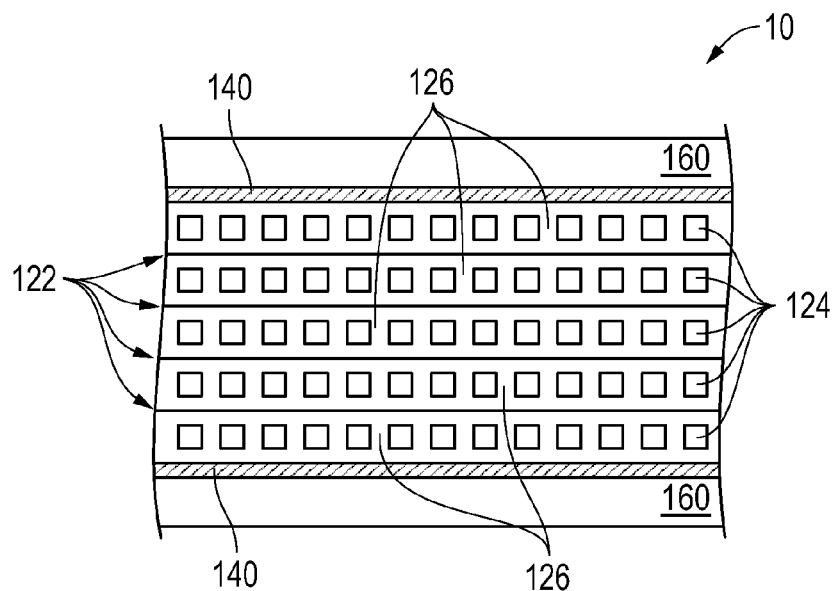
FIG. 1 is a sectional end view of a portion of a conventional radiation sensor.

A radiation sensor can have responses that may or may not have an angular dependence. For example, the response for a cylindrical radiation sensor will not have an angular dependence due to a round shape about a central axis. Unlike the embodiments of the semi-cylindrical radiation sensor, a flat radiation sensor, such as the radiation sensor 300 as illustrated in FIG. 1, has an angular dependence.

Figure 5:
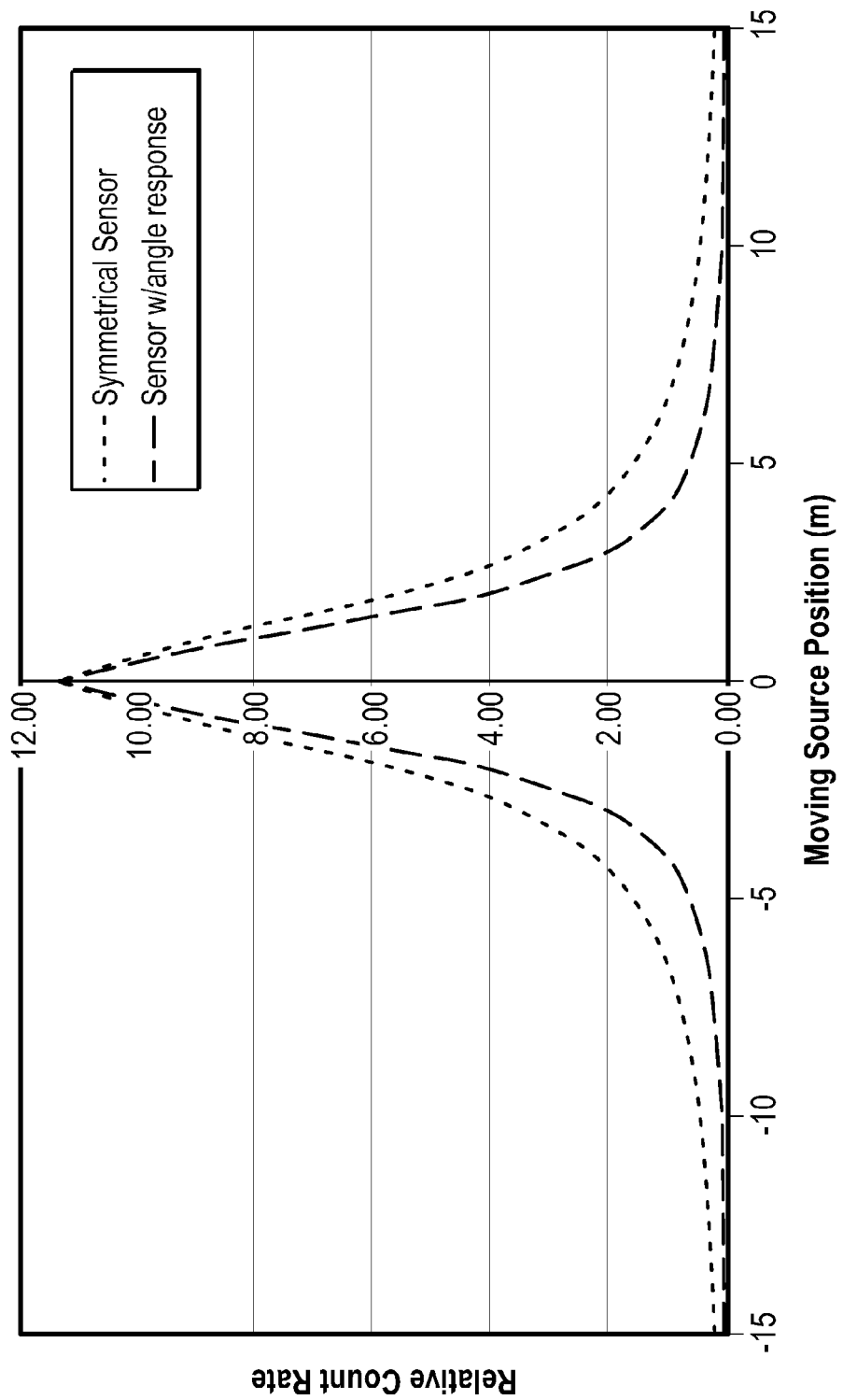
FIGS. 5 and 6 are schematic end and perspective views of embodiments of a radiation detection apparatus in operation.

FIG. 5 is a plot of a relative count rate as a function of the position of a moving radiation source for a symmetrical radiation sensor and another radiation sensor having angular dependence. For a cylindrical radiation sensor, the radiation source moves along a tangent to the outer surface. For a flat radiation sensor, the radiation source moves parallel to the flat surface. The motion is similar to the motion of an object, such as a human or a truck that passes by a radiation detector that is used at a port of entry.

When comparing the cylindrical radiation sensor to the flat radiation sensor, the cylindrical radiation sensor has significantly higher relative counts as a radiation source approaches and moves away from the center of the radiation sensor. Thus, the cylindrical radiation sensor senses a radiation source before the flat radiation sensor senses the radiation source. The cylindrical radiation sensor also senses a radiation source for a longer time than the flat radiation sensor. When a radiation source is more than 1 meter away from the center of the radiation sensor, the cylindrical radiation sensor has a count rate of about 50% higher than the flat radiation sensor.

Figure 6:
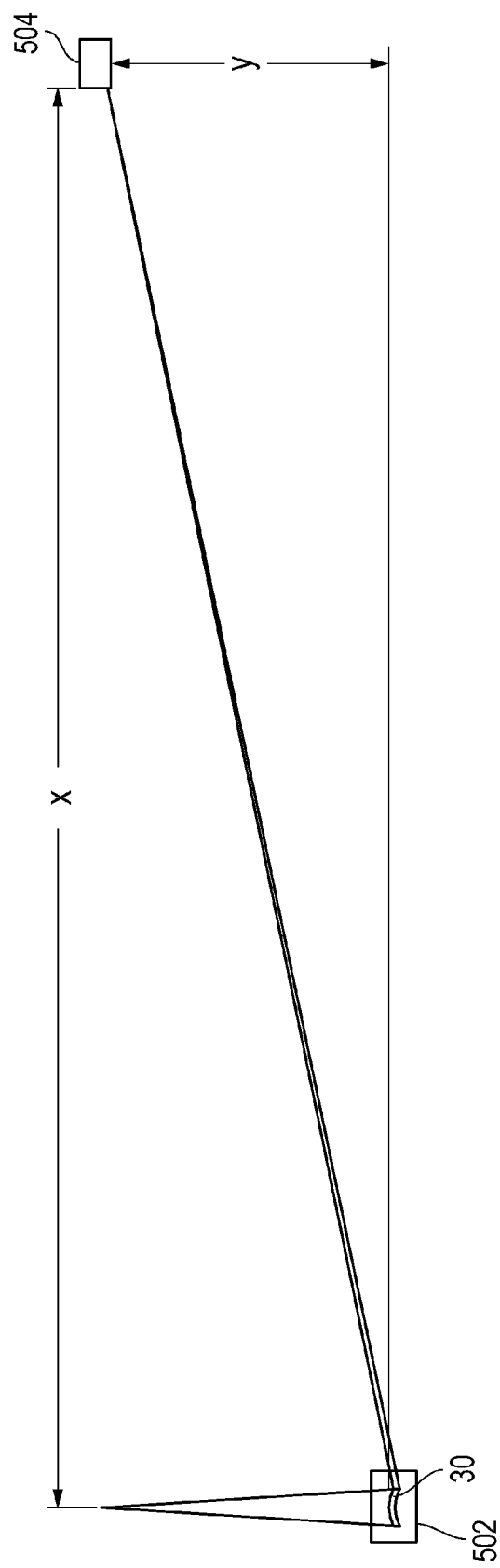
Figure 7:
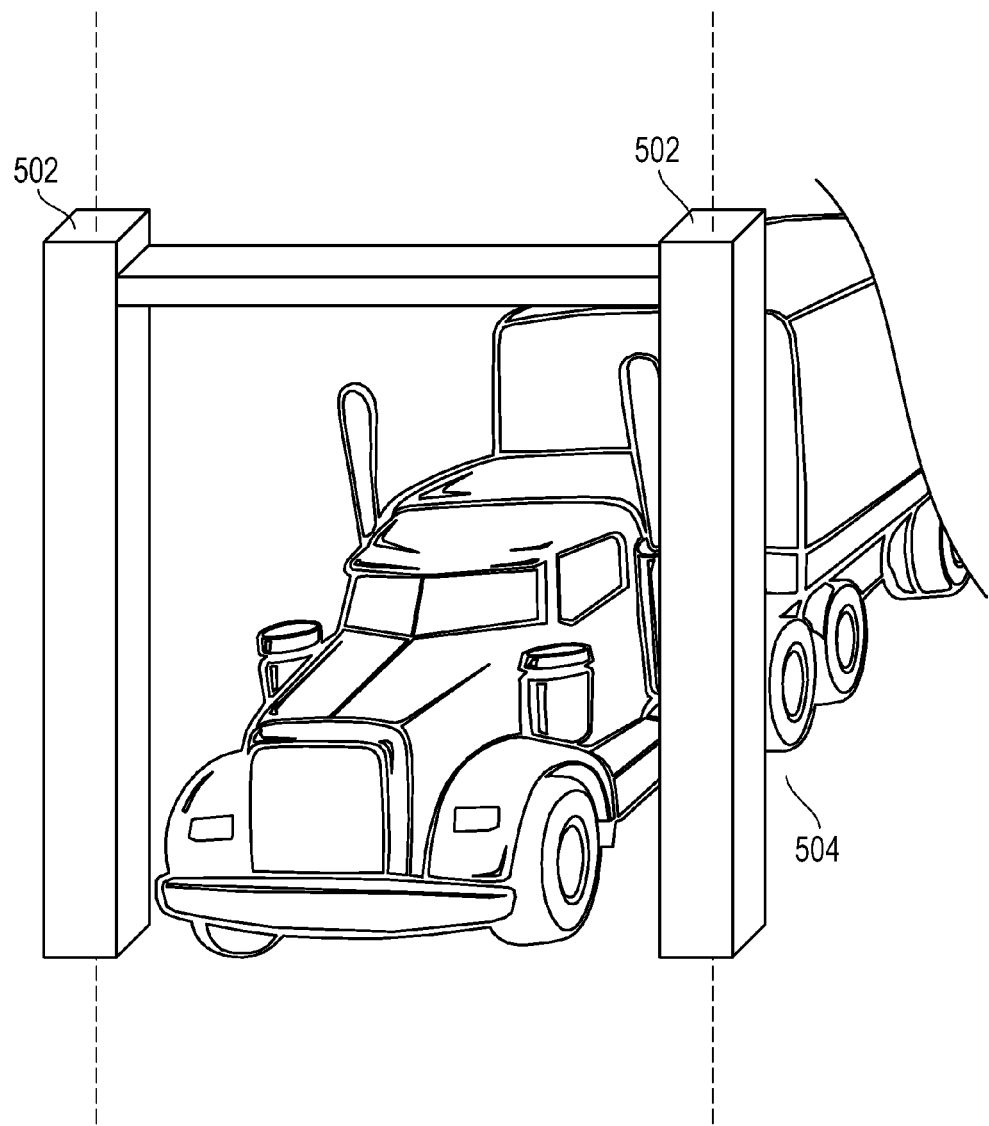
FIG. 7 is a plot of radiation sensitivity of different types of detectors as a function of distance from the center of the detector.

The radiation detection apparatus can be a medical imaging apparatus, a well logging apparatus, a security inspection apparatus, or the like. As illustrated in FIGS. 6 and 7, the radiation detection apparatus 502 can be used as a security inspection apparatus. The radiation detection apparatus 502 can include one or more radiation sensors and photosensor arrangements (not separately illustrated) as described herein. The radiation sensor(s) can be of any of the previously described radiation sensors. The radiation sensor(s) may be located within either or both of the vertical columns, the horizontal cross member, or any combination thereof.

When in use, an object 504 can be placed near or pass through an opening within radiation detection apparatus 502. As illustrated in the embodiment of FIG. 7, the object 504 may be a vehicle such as a truck. The radiation detection apparatus 502 can capture at least part of the targeted radiation emitted by the object 504. The radiation sensors can emit scintillating light or wavelength shifted light that is converted to an electronic signal by the photosensors. The electronic signal can be transmitted to a control module (not illustrated) for further analysis.

The embodiments disclosed herein improve the angular sensitivity of the detector system to neutrons compared to conventional flat designs. Since detectors are typically deployed in areas where the source can be moving in front of the detectors, it is desirable to have the sensitivity be as high as possible. Some embodiments of curved detectors may have an angular response>80 cps compared to the same test parameters run for the angular dependence test on the flat detector with no variation in moderator design. This represents an improvement of approximately 50%. With regard to moving vehicle (source) tests, the angular dependence is compounded by distance. Embodiments of curved detectors also provide an improvement for such tests, such as a relative improvement over conventional flat designs of at least about 10%, which may equate to more neutrons being counted in a given time span. Since neutrons are not found in nature, this improves the sensitivity of the detector (signal to noise) with a given false alarm threshold.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A radiation detection apparatus, comprising:
a housing having an axis;
a radiation sensor disposed in the housing and extending in an axial direction, the radiation sensor having optical fibers with photosensors coupled thereto, phosphorescent material and a reflector surrounding the optical fibers and phosphorescent material, and an electronics module electrically coupled to the photosensors; and
the radiation sensor is semi-cylindrical in shape and formed at a radius relative to the axis.

2. A radiation detection apparatus according to claim 1, wherein the radiation sensor spans an arcuate range of approximately 45° to approximately 90°.

3. A radiation detection apparatus according to claim 1, wherein the radius is in a range of about 6 inches to about 18 inches.

4. A radiation detection apparatus according to claim 1, wherein the radiation sensor has a front surface that is convex, a rear surface that is concave and opposite the front surface, side walls that extend between the front and rear surfaces, and the side walls are flat and parallel to each other.

5. A radiation detection apparatus according to claim 1, wherein the radiation sensor comprises two radiation sensors that are separated by a moderator that converts fast neutrons into thermal neutrons.

6. A radiation detection apparatus according to claim 5, wherein each of the radiation sensors has a radial thickness of about 0.1 to about 0.5 inches, and the moderator has a radial thickness of about 0.5 to about 2.0 inches.

7. A radiation detection apparatus according to claim 5, wherein the moderator comprises a polymer, such as polyethylene.

8. A radiation detection apparatus according to claim 1, wherein the optical fibers are formed in arrays and encased in a binder, the phosphorescent material comprises layers between the arrays, and reflectors are located on sides of the arrays.

9. A radiation detection apparatus according to claim 1, wherein the radiation sensor has a radiation sensing region in a direction tangent to the semi-cylindrical shape of at least approximately 2 meters, at least approximately 4 meters, at least approximately 8 meters, or at least approximately 10 meters.

10. A radiation detection apparatus according to claim 1, wherein a targeted radiation is neutrons.

11. A radiation detection apparatus according to claim 1, wherein a targeted radiation is gamma radiation.

12. A radiation sensor, comprising:
a body extending in an axial direction and having optical fibers with photosensors coupled thereto, phosphorescent material and a reflector surrounding the optical fibers and phosphorescent material, and an electronics module electrically coupled to the photosensors; and
the body is semi-cylindrical in shape and formed at a radius relative to the axis.

13. A radiation sensor according to claim 12, wherein the body spans an arcuate range of approximately 45° to approximately 90°.

14. A radiation sensor according to claim 12, wherein the radius is in a range of about 6 inches to about 18 inches.

15. A radiation sensor according to claim 12, wherein the body has a front surface that is convex, a rear surface that is concave and opposite the front surface, side walls that extend between the front and rear surfaces, and the side walls are flat and parallel to each other.

16. A radiation sensor according to claim 12, wherein the body comprises two radiation sensors that are separated by a moderator that converts fast neutrons into thermal neutrons.

17. A radiation sensor according to claim 16, wherein each of the radiation sensors has a radial thickness of about 0.1 to about 0.5 inches, and the moderator has a radial thickness of about 0.5 to about 2.0 inches.

18. A radiation sensor according to claim 16, wherein the moderator comprises a polymer, such as polyethylene.

19. A radiation sensor according to claim 12, wherein the optical fibers are formed in arrays and encased in a binder, the phosphorescent material comprises layers between the arrays, and reflectors are located on sides of the arrays.

20. A radiation sensor according to claim 12, wherein the body has a radiation sensing region in a direction tangent to the semi-cylindrical shape of at least approximately 2 meters, at least approximately 4 meters, at least approximately 8 meters, or at least approximately 10 meters.

21. A radiation sensor according to claim 12, wherein a targeted radiation is neutrons.

22. A radiation sensor according to claim 12, wherein a targeted radiation is gamma radiation.

* * * * *

UNITED STATES PATENT AND TRADEMARK OFFICE
CERTIFICATE OF CORRECTION

| | | |
|---|---|---|
| PATENT NO. | : 8,916,828 B2 | Page 1 of 1 |
| APPLICATION NO. | : 13/602426 | |
| DATED | : December 23, 2014 | |
| INVENTOR(S) | : Frank | |

It is certified that error appears in the above-identified patent and that said Letters Patent is hereby corrected as shown below:

On the title page item (73) delete "Saint-Global" and insert --Saint-Gobain--

Signed and Sealed this
Fifteenth Day of December, 2015

Michelle K. Lee
*Director of the United States Patent and Trademark Office*